United States Patent [19]

Hunter et al.

[11] Patent Number: 5,058,911
[45] Date of Patent: Oct. 22, 1991

[54] SWIVEL TOOL TRAY

[76] Inventors: Rudolph Hunter, 3362 Toledo Ter. H2, Hyattsville, Md. 20782; George Spector, 233 Broadway Rm 3815, New York City, N.Y. 10007

[21] Appl. No.: 501,910

[22] Filed: Mar. 29, 1990

[51] Int. Cl.⁵ ............................................. B62B 3/02
[52] U.S. Cl. .................... 280/47.35; 212/196; 212/197; 248/285; 248/287; 248/296; 280/35; 280/755
[58] Field of Search ............ 280/47.35, 35, 47.34, 280/727, 755; 248/285, 287, 296; 212/196, 197, 198

[56] References Cited

U.S. PATENT DOCUMENTS

| 264,157 | 9/1882 | Hepburn | 280/47.35 |
|---|---|---|---|
| 947,153 | 1/1910 | Forth | 248/287 |
| 960,483 | 6/1910 | Becker | 248/285 |
| 3,271,044 | 9/1966 | Bosko et al. | 280/47.35 |

*Primary Examiner*—Andres Kashnikow
*Assistant Examiner*—Eric Culbreth

[57] ABSTRACT

A swivel tool tray is provided and consists of an arm adjustably retained within a sleeve that is vertically affixed to an upper outside corner of a wheeled cart. A horizontal extension member is swivably attached to the top of the arm so that it can swivel 360 degrees. A pan is removably attached at a right angle to a distal end of the extension member, whereby the pan can hold a variety of tools and other items therein.

1 Claim, 1 Drawing Sheet

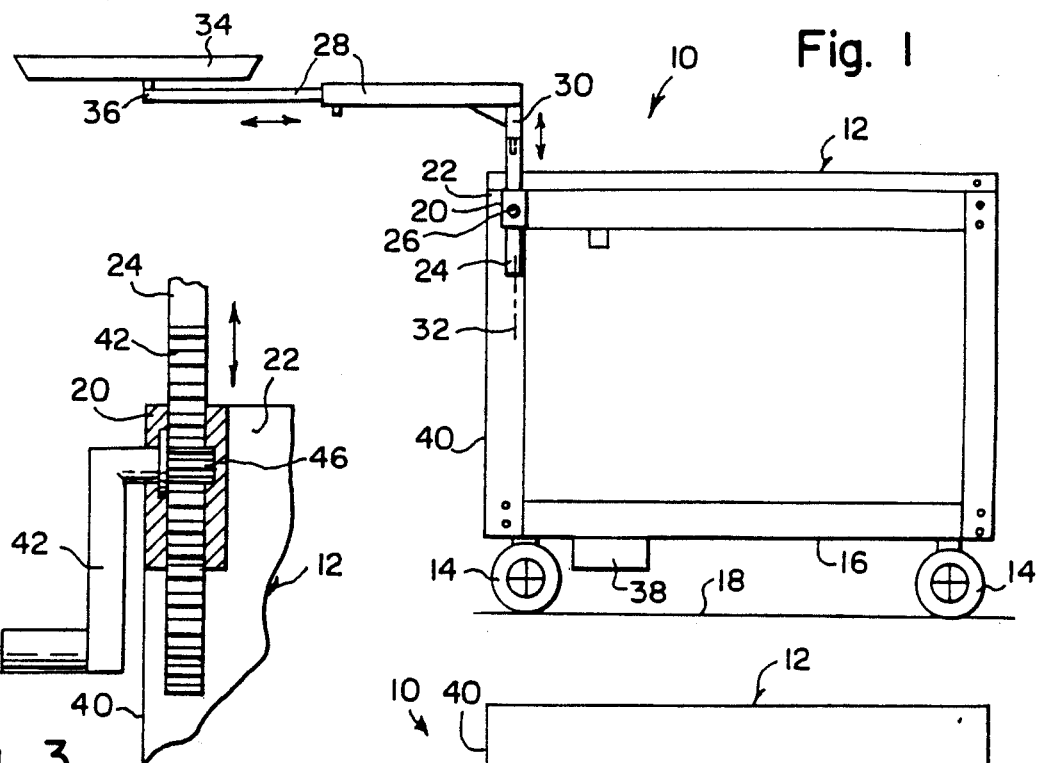
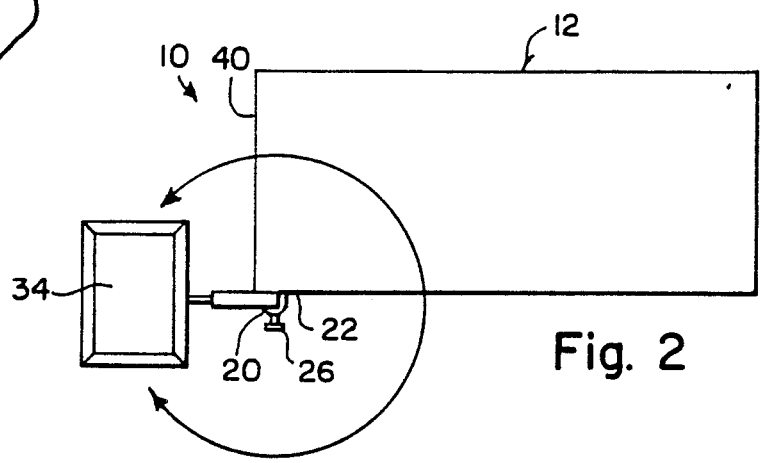
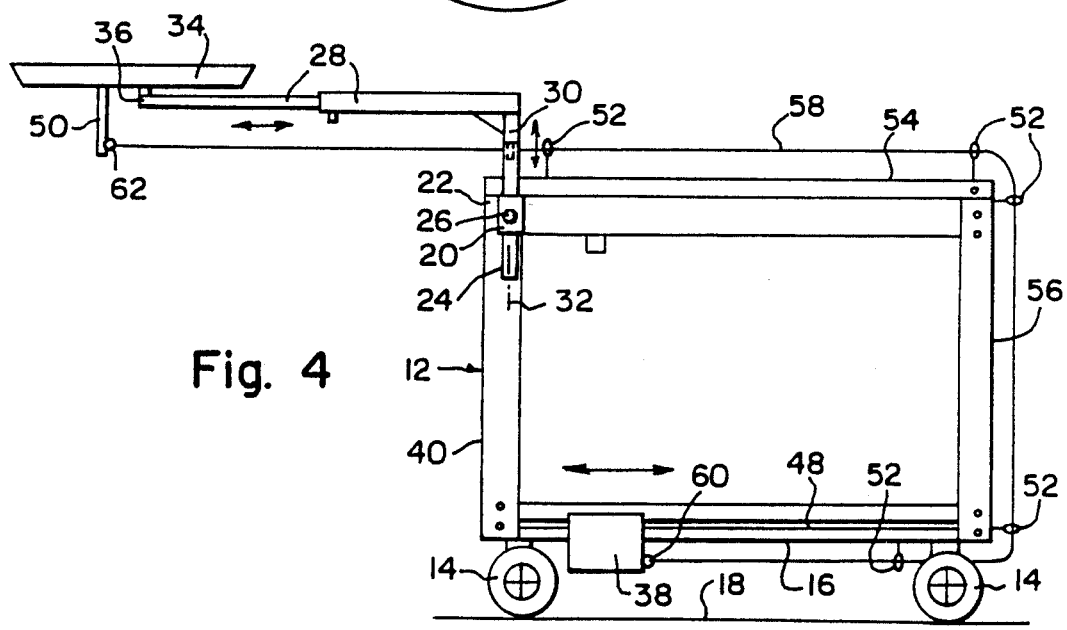

SWIVEL TOOL TRAY

BACKGROUND OF THE INVENTION

The instant invention relates generally to tool holding devices and more specifically it relates to a swivel tool tray which provides an adjustable pan for holding various tools within reaching distance for a person.

There are available various conventional tool holding devices which do not provide the novel improvements of the invention herein disclosed.

SUMMARY OF THE INVENTION

A primary object of the present invention is to provide a swivel tool tray that will overcome the shortcomings of the prior art devices.

Another object is to provide a swivel tool tray that includes a pan adjustably extending from a cart which will hold various tools and items and keep them within reaching distance for a person.

An additional object is to provide a swivel tool tray in which a slidable counterweight on bottom of a cart is controlled by a horizontal adjustment of an extension member for the pan to stabilize the balance of the cart.

A further object is to provide a swivel tool tray that is simple and easy to use.

A still further object is to provide a swivel tray that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of the invention.

FIG. 2 is a diagrammatic top view thereof showing that the pan on an extension member can swivel 360 degrees about an axis of an arm.

FIG. 3 is an enlarged detail view partly in section of a modification in which a rack and pinion in combination with a crank handle is provided for height adjustment of the vertical arm.

FIG. 4 is a side view similar to FIG. 1, showing another modification in which a slidable counterweight on a track is controlled by a horizontal adjustment of the horizontal extension member by a connection with an elongated cord.

DETAILED DESCRIPTION OF THE PREFERRED EMBODIMENTS

Turning now descriptively to the drawings, in which similar reference characters denote similar elements throughout the several views, FIGS. 1 and 2 illustrate a swivel tool tray 10 consisting of a cart 12 having a generally rectangular box shaped configuration. Wheels 14 are mounted to the underside 16 of the cart 12 so that the cart can be moved along a flat surface 18, such as a floor or ground. A sleeve 20 is vertically affixed to an upper outside corner 22 of the cart 12. An arm 24 is adjustably retained within the sleeve 20 by a set screw 26. A horizontal extension member 28 is swivably attached at one end 30 to the top portion of the arm 24, so that the extension member 28 can swivel 360 degrees about the axis 32 of the arm 24.

A pan 34 is removably attached at a right angle to a distal end 36 of the horizontal extension member 28. The pan 34 can hold a variety of tools and other items therein to keep them within a reaching distance for a person. A counterweight 38 is on the underside 16 of the cart 12 to prevent the cart from tipping over when the horizontal extension member 28 with the pan 34 is horizontally extended away from the side 40 of the cart 12.

As shown in FIG. 3, the rack 42 is formed on the bottom portion of the arm 24. A crank handle 44 is provided having a pinion 46 formed on inner portion thereof. The pinion 46 is rotatably carried transversely through the sleeve 20 to cooperate with the rack 42. When the crank handle 44 is rotated in one direction the arm 24 will move up. When the crank handle 44 is rotated in an opposite direction the arm 24 will move down.

FIG. 4 shows a horizontal track 48 is formed at the underside 16 of the cart 12 so that the counterweight 38 can slide therealong. A vertical rod 50 extends downwardly from the bottom of the pan 34. Eyelet rods 52 are spaced apart and fixed to the underside 16, the top 54 and one side 56 of the cart 12 remote from the pan 34. An elongated cord 58 extends through the eyelet rods 52, with one end 60 of the cord 58 affixed to the counterweight 38 and the other end 62 of the cord 58 affixed to the vertical rod 50. Adjustment of the pan 34 on the horizontal extension member 38 will cause the counterweight 38 to slide on the track 48 to stabilize the balance of the cart 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A swivel tool tray comprising:
  a) a cart having a generally rectangular box shaped configuration;
  b) a plurality of wheels mounted to the underside of said cart so that said cart is movable along a flat surface;
  c) a sleeve vertically affixed to an upper outside corner of said cart;
  d) an arm adjustably retained within said sleeve;
  e) a horizontal extendable member swivably attached at one end to the top portion of said arm so that said extension member swivels 360 degrees about an axis of said arm;
  f) a pan removably attached at a right angle to a distal end of said horizontal extendable member whereby said pan is horizontally extendable with said extendable member; further including a counterweight on the underside of said cart to prevent said cart from tipping over when said horizontal extendable member is horizontally adjusted away from the side of said cart;
  g) a horizontal track formed at the underside of said cart so that said counterweight is slidable therealong;
  h) a vertical rod extending downwardly from the bottom of said pan;

i) a plurality of eyelet rods spaced apart and fixed to the underside, the top and one side of said cart remote from said pan; and j) an elongated cord extending through said eyelet rods, with one end of said cord affixed to counterweight and another end of said cord affixed to said vertical rod whereby adjustment of said pan on said horizontal extendable member will cause said counterweight to slide on said track to stabilize the balance of said cart.

* * * * *